US008986518B2

(12) United States Patent
Moncion

(10) Patent No.: US 8,986,518 B2
(45) Date of Patent: Mar. 24, 2015

(54) CARTRIDGE-BASED, HYDROGEN ON-DEMAND GENERATOR

(75) Inventor: Marc Daniel Moncion, Plymouth, MI (US)

(73) Assignee: Cleanworld Fuels, LLC, Royal Oak, MI (US)

( * ) Notice: Subject to any disclaimer, the term of this patent is extended or adjusted under 35 U.S.C. 154(b) by 263 days.

(21) Appl. No.: 13/332,243

(22) Filed: Jan. 18, 2012

(65) Prior Publication Data

US 2013/0180849 A1    Jul. 18, 2013

(51) Int. Cl.
*C25B 1/02* (2006.01)
*C25B 1/04* (2006.01)
*C25B 9/00* (2006.01)
*C25B 9/06* (2006.01)
*C25B 1/06* (2006.01)

(52) U.S. Cl.
USPC ........... 204/263; 204/193; 204/194; 204/242; 204/409; 205/628; 205/630; 205/637; 205/638

(58) Field of Classification Search
CPC .............. C25B 1/02; C25B 1/04; C25B 1/06; C25B 9/00; C25B 9/06
USPC .......... 204/193–194, 242, 263, 409; 205/628, 205/630, 637, 638
See application file for complete search history.

(56) References Cited

U.S. PATENT DOCUMENTS

| 5,954,937 | A | * | 9/1999 | Farmer | 205/687 |
| 5,997,824 | A | * | 12/1999 | Kim | 422/171 |
| 6,068,741 | A | | 5/2000 | Lin | |
| 6,309,532 | B1 | * | 10/2001 | Tran et al. | 205/687 |
| 6,866,756 | B2 | | 3/2005 | Klein | |
| 6,890,410 | B2 | | 5/2005 | Sullivan | |
| 8,449,737 | B2 | * | 5/2013 | Richardson | 204/268 |
| 2009/0025660 | A1 | | 1/2009 | VanHoose et al. | |
| 2009/0288947 | A1 | | 11/2009 | Ostgaard | |
| 2010/0018476 | A1 | | 1/2010 | Zemskova et al. | |
| 2010/0181190 | A1 | | 7/2010 | Romaniuk | |
| 2011/0132750 | A1 | | 6/2011 | Talarico | |
| 2011/0139097 | A1 | | 6/2011 | Brown | |

* cited by examiner

*Primary Examiner* — Zulmariam Mendez

(57) ABSTRACT

The present aspects of an embodiment make more efficient use of hydrogen on-demand (hereinafter "HoD") systems, thereby improving fossil-fuel-powered systems on the market. One main aspect uses a disposable cartridge in which the electrolytic process takes place to separate gas molecules from a solution that uses a substantially dry-cell design. Generally, the aspects include a replaceable and reusable cartridge for the flow of electrolyte solution using a pump, which may include a variety of safety features. A HoD cartridge generator has a plurality of staggered conductive material members that require electrolyte solution to flow between them, from one or more inlets to one or more outlets, using one or more specified paths. A conventional or specially-formulated electrolyte solution may be used. One or more sensors allow the generator to have a steady flow of solution in and a steady flow of liquid-gas mixture out of the system.

10 Claims, 13 Drawing Sheets

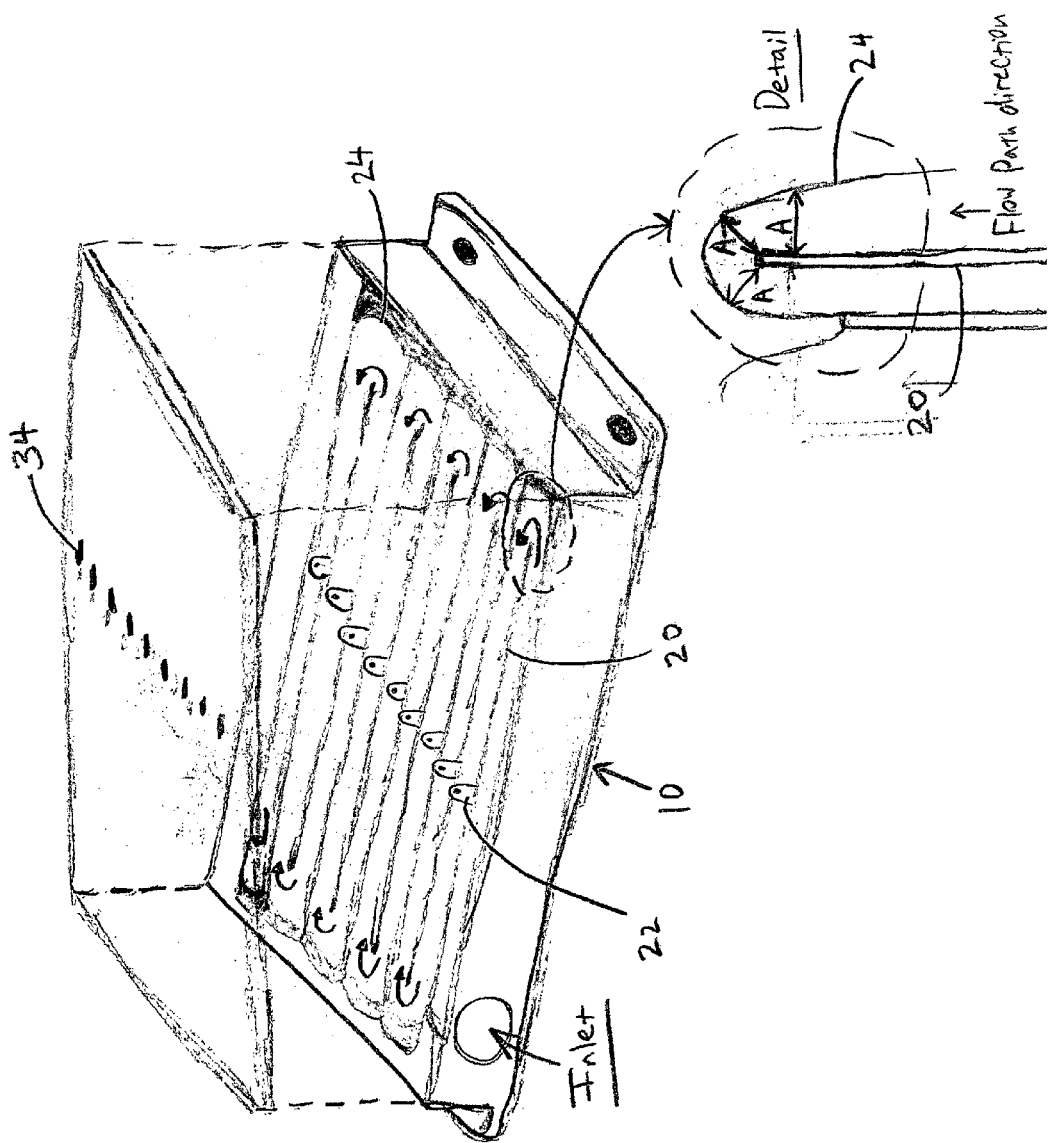

CARTRIDGE-BASED, HYDROGEN ON-DEMAND GENERATOR

FIELD OF THE INVENTION

The main aspects of a main embodiment relate to more efficient, consistent HoD gas to be delivered to a fossil-fuel-powered system without a need for hydrogen gas storage. The main aspects of the embodiments include, but are not limited to, improving engine efficiency for school buses, trucks, trains, marine vehicles, power station facilities, home heating systems, and other fossil-fuel-powered systems.

BACKGROUND OF THE INVENTION

With an increase in demand and price of oil, there is a continuing need for more efficient energy sources. Fossil-fuel-based systems alone are highly inefficient and unnecessarily pollute the air at dangerous levels. It is critical for the world to move toward cleaner and more efficient use of fossil fuels. Originally, HoD systems were rare and hydrogen gas presented safety issues because of its storage. This made using HoD generators impractical to use. Over time, technology has proven helpful in determining more efficient ways to generate and store hydrogen. However, the flammability of hydrogen in storage still poses a major safety risk. If a system is truly one that is HoD, then there would be no need for storage of gases and safety risks would be reduced. The problem has partially been solved by products with safety features that protect against such failure modes. However, the results of those systems are questionable because they lack consistency, the results are skewed, they are not cost-effective, and they lack environmental friendliness.

Another main problem associated with HoD generation through electrolysis is longevity of components because of corrosion. The material used to facilitate electrolysis in HoD generators should be highly corrosion-resistant. Corrosion is inevitable because electrolysis naturally favors it.

I have found numerous problems in current products on the market. I have found that the products fail to deliver consistent results; they use traditional means of wet-cell electrolysis instead of mostly dry-cell methods, and are not cost-effective when implemented. Maintenance costs for replacing material, in conjunction with use of traditional electrolyte solutions, create cost-prohibitive HoD generators that defeat the purpose of implementation in the first place.

Moreover, some currently-available products are less efficient because the variables their flow depends on change continuously. This defeats the purpose of making the fossil-fuel-powered source more efficient because the constant fluctuations cause those HoD generators to expend more energy to match hydrogen gas output on a continuous basis. Many products also include parts that are not essential, thereby making the product unnecessarily complex and costly.

Specifically, the shortcomings of the prior art include one or more of the following: (1) Parallel conductive material must be oriented in a specific direction to be effective; (2) Electrolyte solution is highly corrosive; (3) Lacks a variable controller for voltage and output adjustment; (4) Pump circulates electrolyte solution conventionally; (5) Separate cleansing mode is required; (6) Generator unit is difficult to replace and non-disposable; (7) Two-solenoid, wet-cell design in which all conductive material edges are exposed to electrolyte solution; (8) Pump is a screw-type element made of silicon bronze; (9) Generator housing serves as a container for electrolyte solution; (10) Plurality of conductive material members are spot-welded together with plastic pins and spacers; (11) Additional assembly is required to direct hydrogen and oxygen off conductive material members; (12) Uses a straight or curved tubular heating element as opposed to the absence of a heater; (13) Electronic control module is used to vary the output; (14) Generator module does not automatically drain into reservoir; (15) Separate micron filter is used instead of an integrated filter; (16) Functions within 0-50 Ampere range; (17) Pumps water intermittently instead of continuously; (18) Pulse-width modulator used to control power to the generator; (19) Freezing temperatures require drainage of electrolyte solution; (20) No integrated cooling system is used; (21) Orifice injects directly into engine; (22) Cycles on and off based on pressure sensors; and (23) Are not practical for traditional and modern fossil-fuel-powered system integration.

It would be advantageous to provide a replaceable cartridge-based, HoD generator system that is easy to install and is compatible with older and newer vehicles.

It would be advantageous to provide a HoD generator cartridge with parallel conductive material members that may be placed in any orientation.

It would be advantageous to reduce engine damage and increase overall engine efficiency by using a reservoir that includes a baffle to reduce sloshing which, in turn, will avoid electrolyte solution from getting into the engine intake.

It would be advantageous to provide consistent results and savings by using a fixed-output and step-down voltage controller, connected to a microprocessor with a direct current ("DC-to-DC") converter.

It would be advantageous to provide a method for circulating electrolyte through a cartridge HoD generator to make the system more efficient and durable.

It would be advantageous to provide a continuously-filtered electrolyte solution to save time, effort, and cost by avoiding a separate cleansing element.

It would be advantageous to provide a disposable and replaceable cartridge generator unit, which is more cost-effective and more convenient than periodically installing a new generator unit.

It would be advantageous to provide at least one dry cell that is more resistant to heat and premature corrosion than typical HoD systems.

It would be advantageous to provide a pump that is a sealed, magnetically-driven element which isolates the electrolyte solution from the motor assembly.

It would be advantageous to provide a generator housing that serves as a compact, disposable conduit.

It would be advantageous to provide a plurality of conductive material members in an isolated enclosure.

It would be advantageous to provide a thermistor from a microprocessor-based, DC-to-DC converter attached to a radiator coil to regulate DC output to the HoD generator.

It would be advantageous to provide a steady-state output using a microprocessor-based, DC-to-DC converter for consistent results and energy savings.

It would be advantageous to provide a valve drain, including a gravity-feed system that drains into a reservoir automatically as a safety feature when a pump fails or when a generator system is off.

It would be advantageous to provide a HoD system that naturally traps hydrogen gas and stops current flow between conductive material members when a pump fails or stops.

It would be advantageous to provide an integrated, durable filter.

It would be advantageous to provide a relatively low, steady DC voltage with a limited current flow to attain consistent results and a safer operating environment.

It would be advantageous to provide a HoD cartridge generator that reduces fuel consumption and reduces harmful exhaust emissions.

It would be advantageous to provide an external electrolyte solution reservoir with a higher capacity-to-mileage ratio.

It would be advantageous to provide a cooling system to maintain proper operating temperature.

It would be advantageous to provide an additive to a generator system in freezing weather to avoid drainage and damage to a HoD system.

It would be advantageous to provide a modularized reservoir for storage of electrolyte solution.

It would be advantageous to provide accommodating orientation of a HoD cartridge generator.

It would be advantageous to provide a polarity-switching device for staggered conductive material members within a HoD cartridge generator.

Thus, some advantages of one or more aspects are that a cartridge-based, HoD system is more cost-effective and more energy efficient. Other advantages of one or more aspects are that a HoD cartridge generator system is easy to install. These and other advantages of one or more aspects will become apparent from a consideration of the ensuing description and accompanying drawings.

SUMMARY OF THE INVENTION

The present description is of main aspects of an embodiment that solves the aforementioned problems by providing an improved HoD generator using an easily replaceable cartridge. Aspects of the embodiments are unique because they use a reusable and disposable cartridge that is composed of a substantially dry-cell design, meaning they use at least two conductive material members that are polarized and not fully immersed in electrolyte solution. Generally, the present aspects include a cartridge for the flow of electrolyte solution using a pump. The module may include a detection mechanism to warn the user of a low level of electrolyte solution. A less urgent and a more urgent alert are automated and may be included in an embodiment. The HoD reusable cartridge and core includes modifications for different industries. The cartridge has a plurality of staggered conductive material members that require electrolyte solution to flow steadily between them, from one or more inputs to one or more outputs, using one or more paths. A conventional or specially-formulated electrolyte solution or other matter may be used.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiment. Accordingly, other aspects and a more comprehensive understanding of the invention may be obtained by referring to the detailed description of the exemplary embodiment taken in conjunction with the accompanying drawings, in addition to the scope of the invention defined by the claims.

BRIEF DESCRIPTION OF THE DRAWINGS

A complete understanding of present aspects of the invention may be obtained by reference to the accompanying drawings, when considered in conjunction with the subsequent, detailed description, in which:

FIG. 13 is an isometric, exploded view of the HoD cartridge generator with the upper enclosure separated from the remainder of the cartridge.

For purposes of clarity and brevity, like elements and components will bear the same designations and numbering throughout the Figures.

DESCRIPTION OF A MAIN EMBODIMENT

Figure 1:
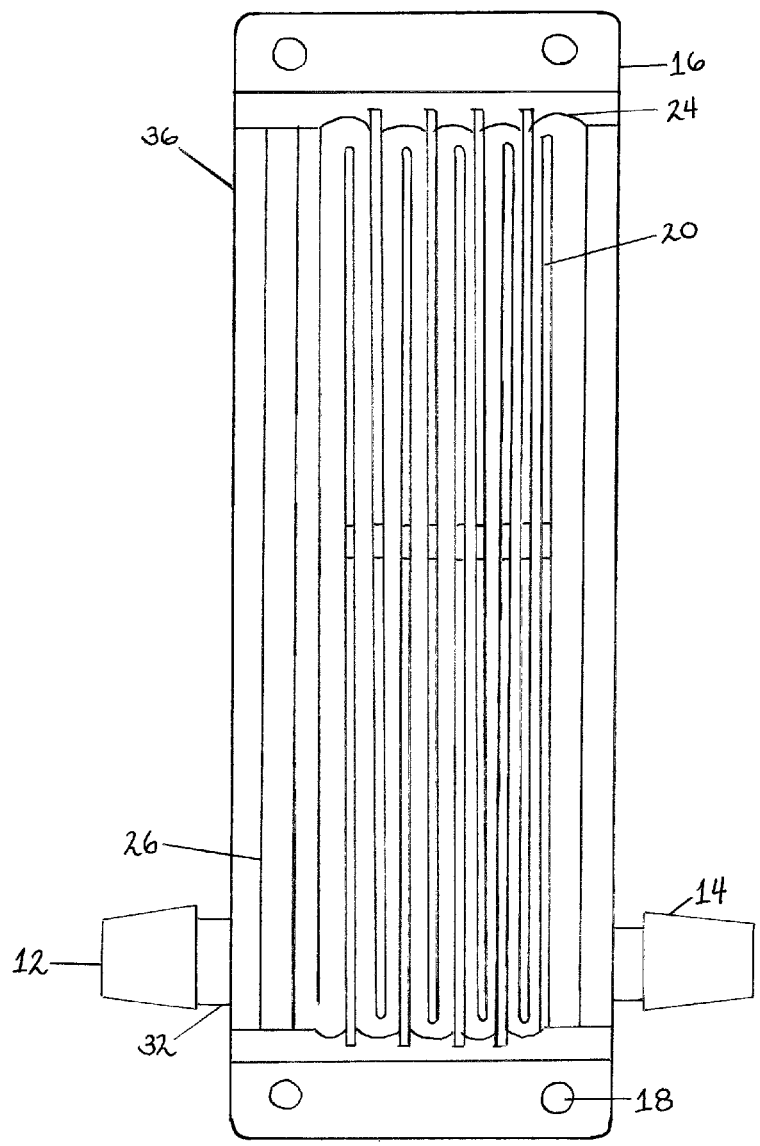
FIG. 1 is a top view of a main embodiment.
Figure 4:
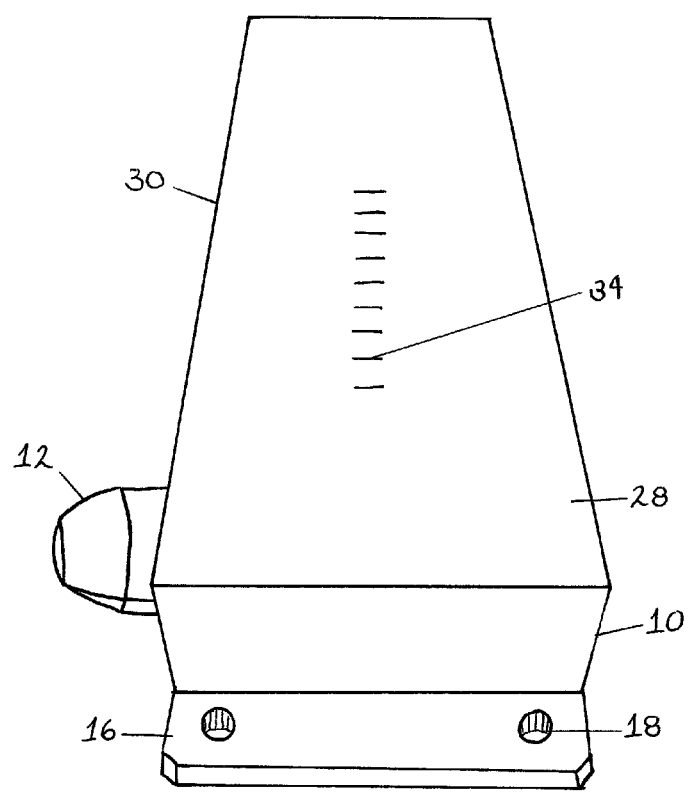
FIG. 4 is a right perspective view of a main embodiment.
Figure 5:
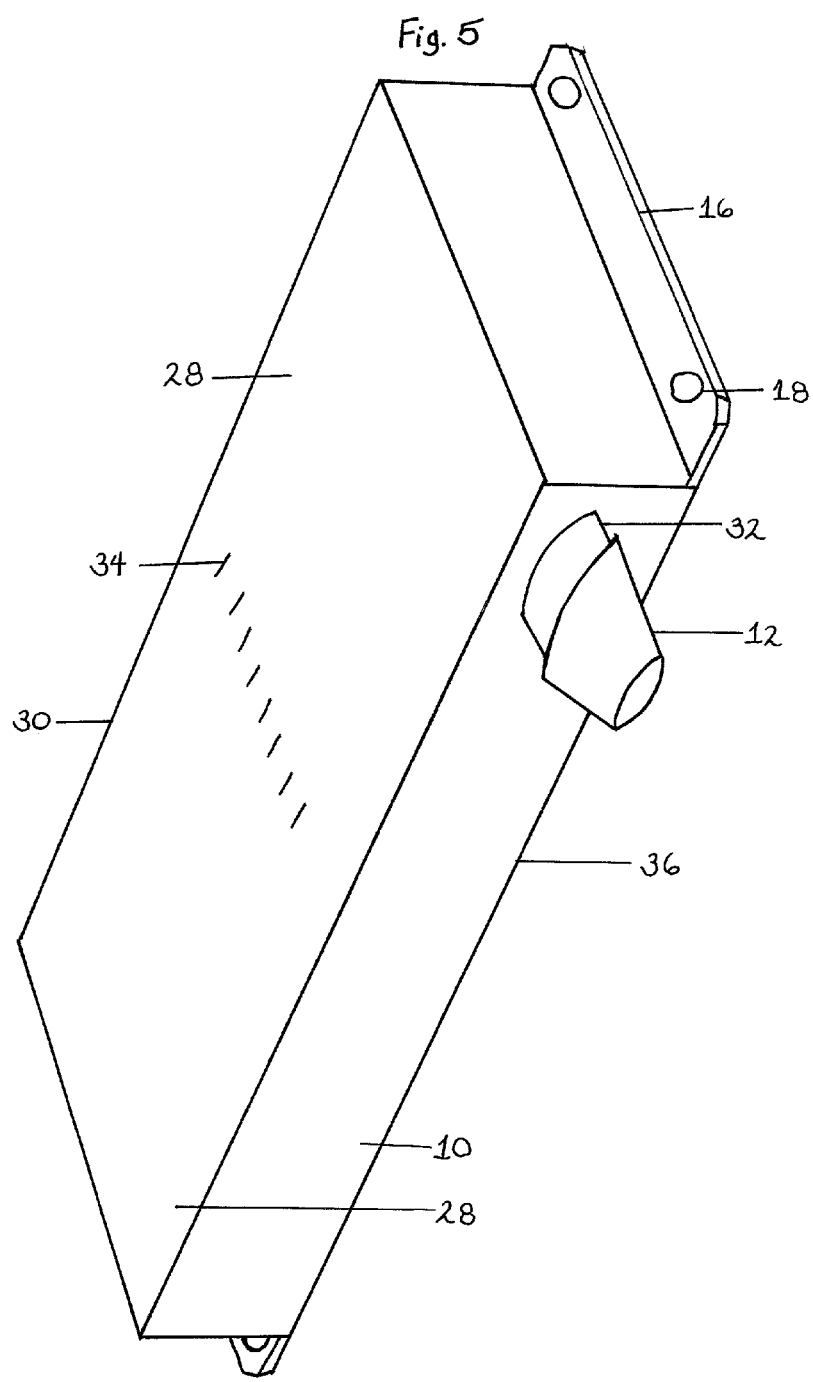
FIG. 5 is a rear perspective view of a main embodiment.

FIG. 1 shows a top view of a HoD cartridge generator 36 main embodiment without an upper enclosure 28. A cartridge structure comprises a lower enclosure 10 (FIG. 3) and an upper enclosure 28 (FIG. 4). When enclosures are aligned and connected with one another, they form a complete enclosure 30 (FIG. 5).

Figure 9:
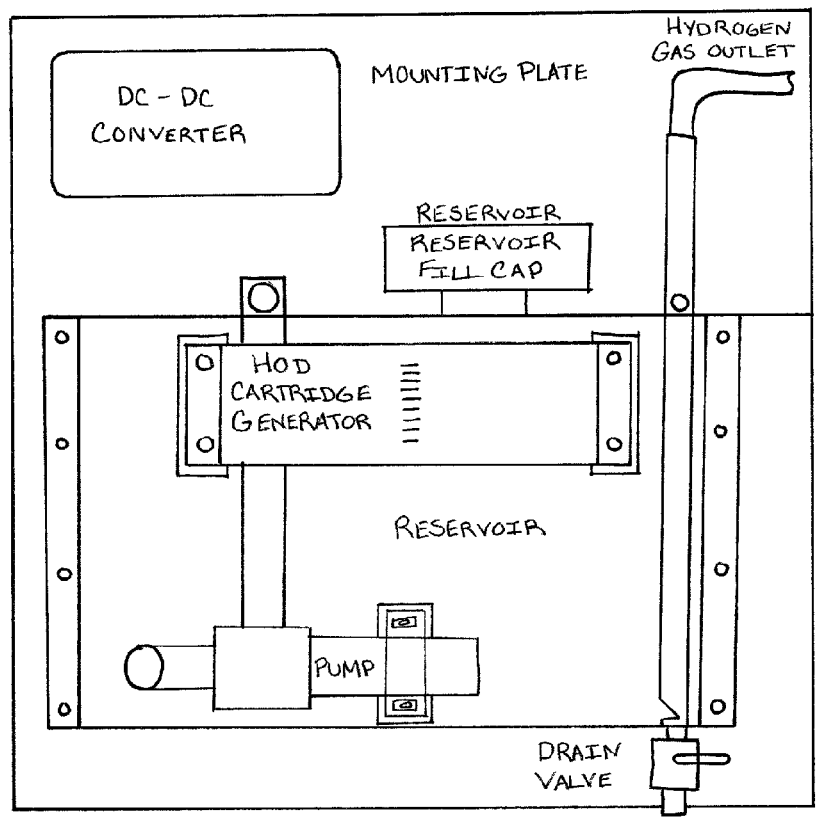
FIG. 9 is a front plan view of a HoD cartridge generator complete system embodiment diagram.

A lower enclosure 10 (FIG. 3) provides at least one integrated mounting flange 16 (FIG. 1) on either end of a HoD cartridge generator 36. In a main embodiment, one or more of an integrated mounting hole 18 (FIG. 1) is included on each of at least one complete enclosure 30. Accordingly, electrolyte solution will flow into a HoD cartridge generator 36 from an inlet fitting 12 (FIG. 4). Flow into a HoD cartridge generator 36 may be powered by a conventional pump (FIG. 9). An electrolyte solution may follow a staggered path set by each conductive material member 20, collectively a plurality of conductive material members. Each conductive material member 20 with parallel orientation to one another, in a main embodiment, will be polarized to facilitate an electrochemical reaction decomposing a solution in a substantially dry-cell design. After going through a HoD cartridge generator 36, a liquid-gas mixture will exit through an outlet fitting 14 hole, through an outlet fitting 14, and into a pre-combustion air intake. Any excess electrolyte solution will go back through the HoD cartridge generator by returning to the reservoir (FIG. 9). Inner walls relative to a HoD cartridge generator 36 complete enclosure 30 contains at least one enclosure rounded corner 24 in order to facilitate a transfer of gases through the HoD cartridge generator 36.

Generally, an enclosure rounded corner serves in facilitating the rounded movement of gas bubbles so that the cartridge will decompose the electrolyte solution steadily and continue a steady flow of solution in and steady flow of liquid-gas mixture out of the cartridge. In an embodiment, at least one integrated mounting flange 16 has at least one integrated mounting hole 18 with dimensions of one-quarter inch wide by one-half inch long. In an embodiment, an upper enclosure 28 and a lower enclosure 10 make a complete enclosure (FIG. 5).

Additionally, an embodiment has a conductive plate 20 plurality of nine plates in which five are anodes and four are cathodes. A distance between conductive material members is one-fifth of an inch in an embodiment, in which each member of conductive material has an active area of one inch wide by eight-and-one-half inches long. An integrated over-pressurization safety relief valve may be included, in which a valve body is comprised of plastic or stainless steel in different aspects of an embodiment.

Figure 2:
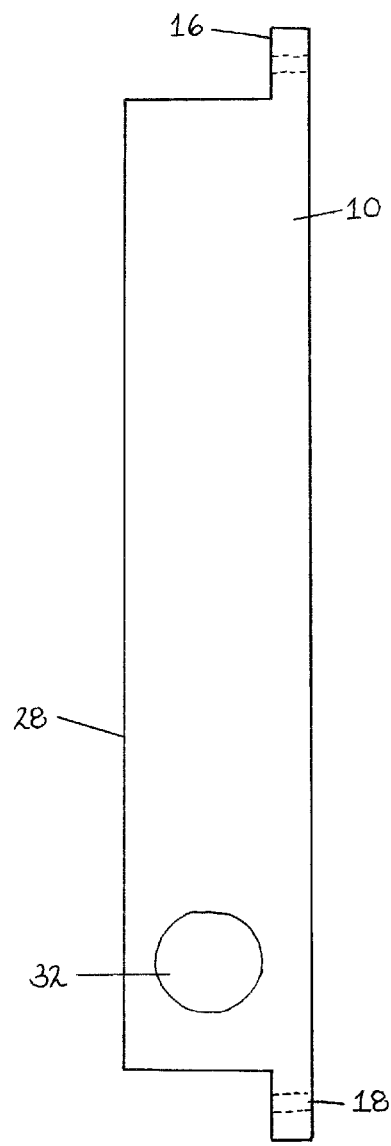
FIG. 2 is a front view of a main embodiment.

FIG. 2 shows a front view of a HoD cartridge generator 36 complete enclosure 30 with an inlet fitting 12 and an outlet fitting 14 is not shown. A fitting hole 32 is placed on either side of a HoD cartridge generator 36 to facilitate placement, mounting, and sealing of each inlet fitting 12 and outlet fitting 14. In an embodiment, a complete enclosure 30 is comprised of plastic and has at least one internal conductive material member mounting slot 34 of a specified length, width, and equal spacing relative to each other in a parallel configuration (FIG. 5). In one embodiment, an enclosure is shaped such that at least one set of a parallel-placed, staggered conductive material member 20 (FIG. 6) is arranged to allow continuous, unidirectional flow of electrolyte solution across each side of every conductive material member in a repetitious pattern from an inlet hole of the HoD cartridge generator 36 to the outlet hole on the other side of the HoD cartridge generator 36 (FIG. 1). In an embodiment, an output of a filter 26 contains a one-half inch barbed inlet fitting 12 and outlet fitting 14. The function of a filter is for a porous device to remove impurities or solid particles from liquids that pass through it within a HoD cartridge generator or system.

Figure 3:
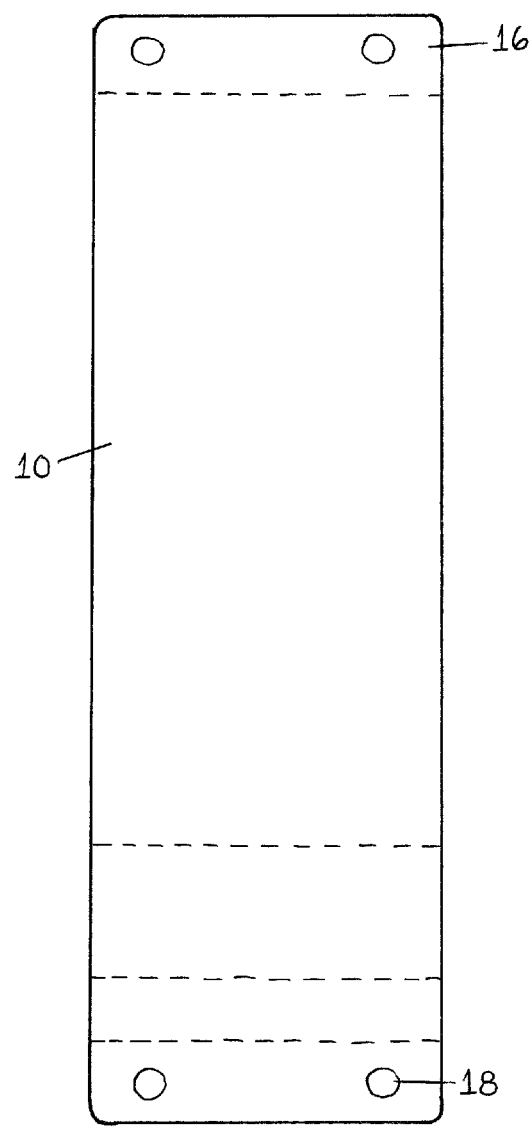
FIG. 3 is a bottom view of a main embodiment.

FIG. 3 shows a bottom view of a HoD cartridge generator 36 complete enclosure 30 with mounting flanges and holes.

FIG. 4 shows a right perspective view of a HoD cartridge generator 36 (FIG. 1) complete enclosure 30 with mounting flanges and holes.

FIG. 5 shows a rear perspective view of a HoD cartridge generator 36 (FIG. 1) with a complete enclosure 30 and an inlet fitting 12. The slots in an upper enclosure 28 allow parallel conductive material members to remain stable and in place relative to one another and relative to a desired cartridge orientation and placement. This feature allows different configurations for different aspects of the embodiment while allowing use of an identical part. This feature also allows a HoD cartridge generator 36 to have one or many individual cells of varying distance between each conductive material member 20. The thickness of a conductive material member is directly proportional to a thickness of an electrical terminal connector that will connect to conductive material members outside of an enclosure of a HoD cartridge generator 36. An inlet fitting 12 will be connected to a reservoir by use of a hose, pipe, or similar device to facilitate the transfer of electrolyte solution from a reservoir to a cartridge by use of a pump, or other similar pressure-controlled, liquid-transferring device. In one embodiment, a HoD cartridge generator is connected to a power control module. The power control module consists of a fused electrical wiring harness that runs from a power source, such as a vehicle battery, solar panels, or other power source. In one embodiment, a battery voltage range is 12 to 15 volts, in which an electrical harness runs to a relay switch. The relay switch provides power to a DC-to-DC converter that lowers the operating voltage of a HoD cartridge generator from battery voltage, typically ranging from 12 to 15 volts, to 5 volts DC. The relay coil is controlled by a series of safety controls.

In one embodiment, safety controls include a low-electrolyte shut-off switch to prevent potential damage to a pump; a high-temperature shut-off switch to prevent excessive steam and gases from entering an outlet tube; voltage from an alternator of an engine to provide power to a relay so that a unit will operate only when an engine is running; a crash shut-off switch to turn a unit off in case of physical damage; and a flame-arrestor shut-off switch in an event of flash ignition of hydrogen gas.

Figure 6:
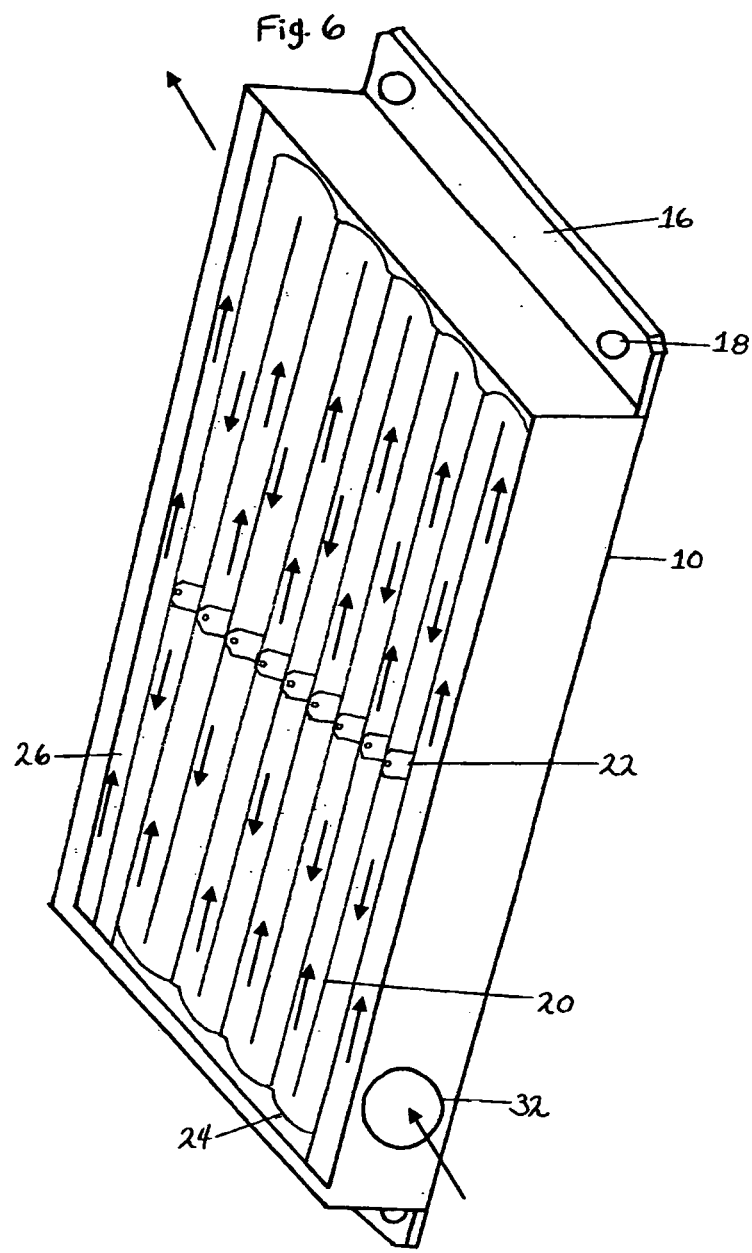
FIG. 6 is a front perspective view of a main embodiment.

FIG. 6 shows a front perspective view of a main embodiment, which does not include an upper enclosure 28, inlet fitting 12, or outlet fitting 14. In one embodiment, one or more of a conductive material electrical interface tab 22 will facilitate sealing and mounting of a source for energy transfer into the HoD cartridge generator 36. Each conductive material electrical interface tab 22 will be placed into each respective conductive material mounting slot (FIG. 4) that is in an upper enclosure 28. In an embodiment, a commercial-grade sealant or an ultrasonic weld may be used to position, hold, and separate components inside a HoD cartridge generator 36 unit from those components outside a HoD cartridge generator.

Figure 7:
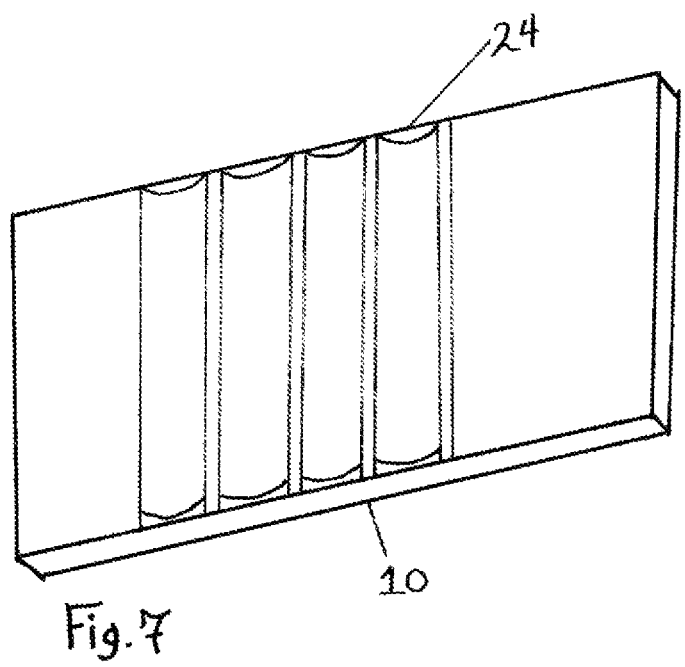
FIG. 7 is a front view of an inner sidewall of a HoD cartridge generator main embodiment.

FIG. 7 shows a perspective view of a HoD cartridge generator 36 enclosure inner sidewall.

Figure 8:
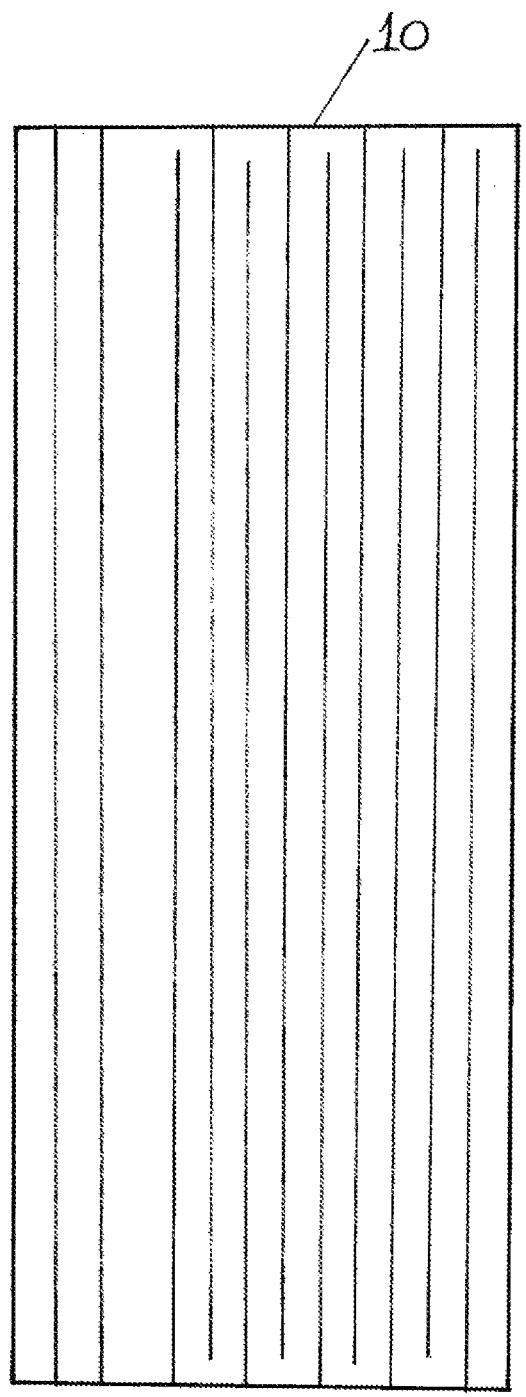
FIG. 8 is a top view of an inside lower enclosure of a main embodiment.

FIG. 8 shows an inside, top view of a HoD cartridge generator 36 lower enclosure 10. An upper enclosure 28 may be used in protection and concealment of cartridge interior components while rigidly holding the mounted conductive material members in position. The lower enclosure may serve as a firmly attached foundation for a number of cartridge components in which it is the body on which other components are laid.

FIG. 9 shows a front plan view of a HoD cartridge generator 36 subsystem assimilated into a conventional diesel-powered system.

Figure 10:
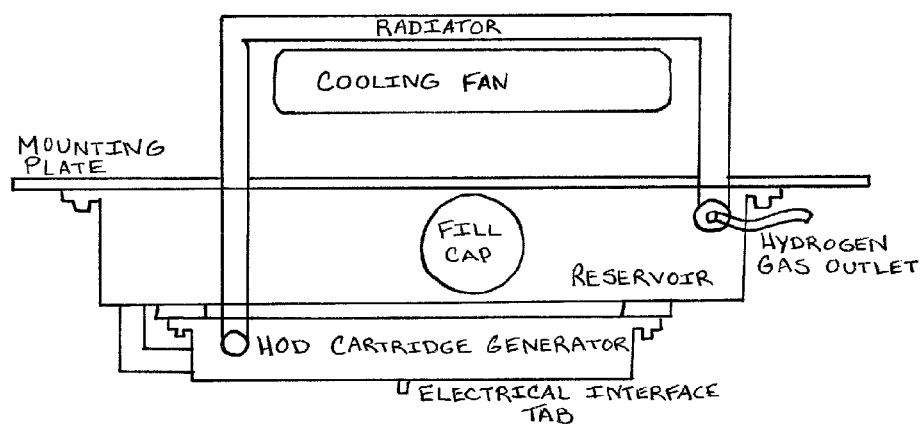
FIG. 10 is a top plan view of a HoD cartridge generator complete system embodiment diagram.

FIG. 10 shows a top plan view of a HoD cartridge generator 36 subsystem assimilated into a conventional diesel-powered system.

Figure 11:
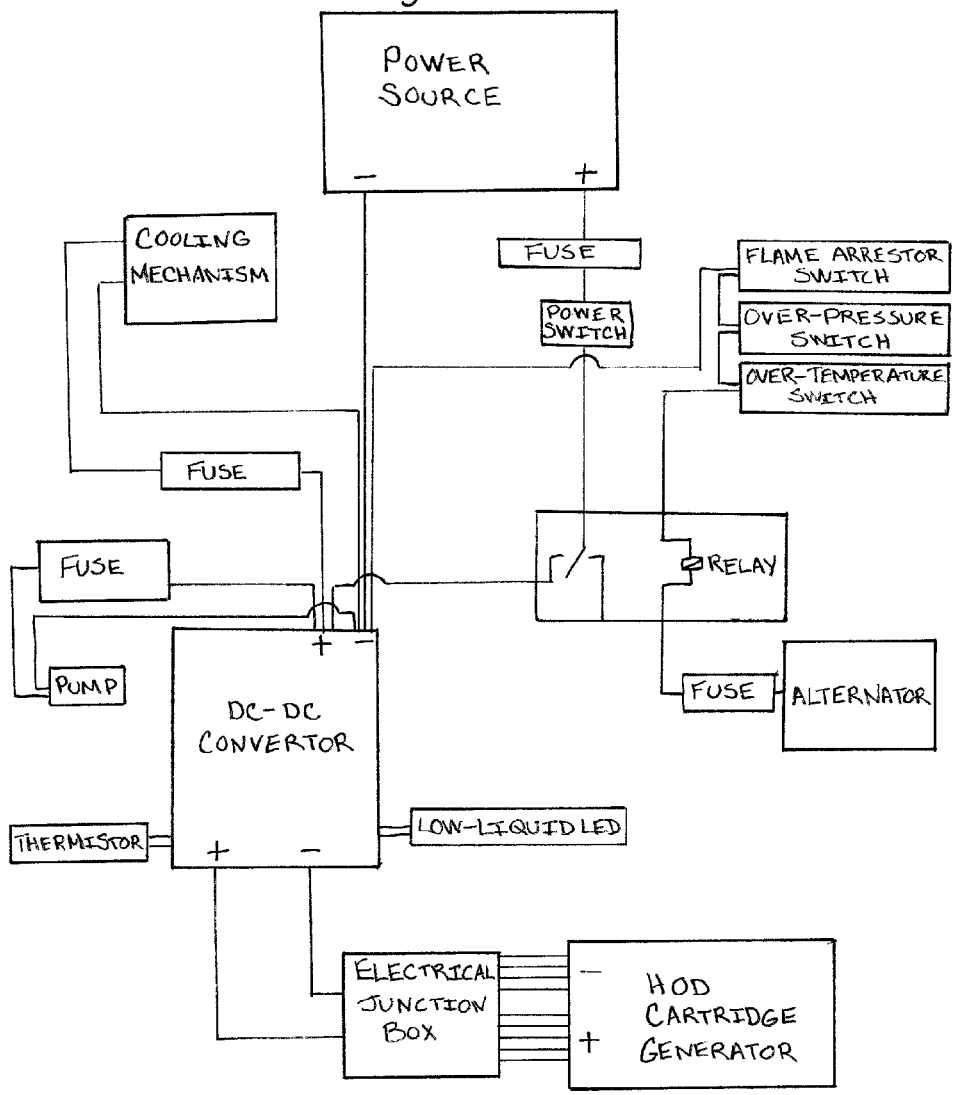
FIG. 11 is a plan view of a HoD cartridge generator complete system embodiment electrical schematic.
Figure 12:
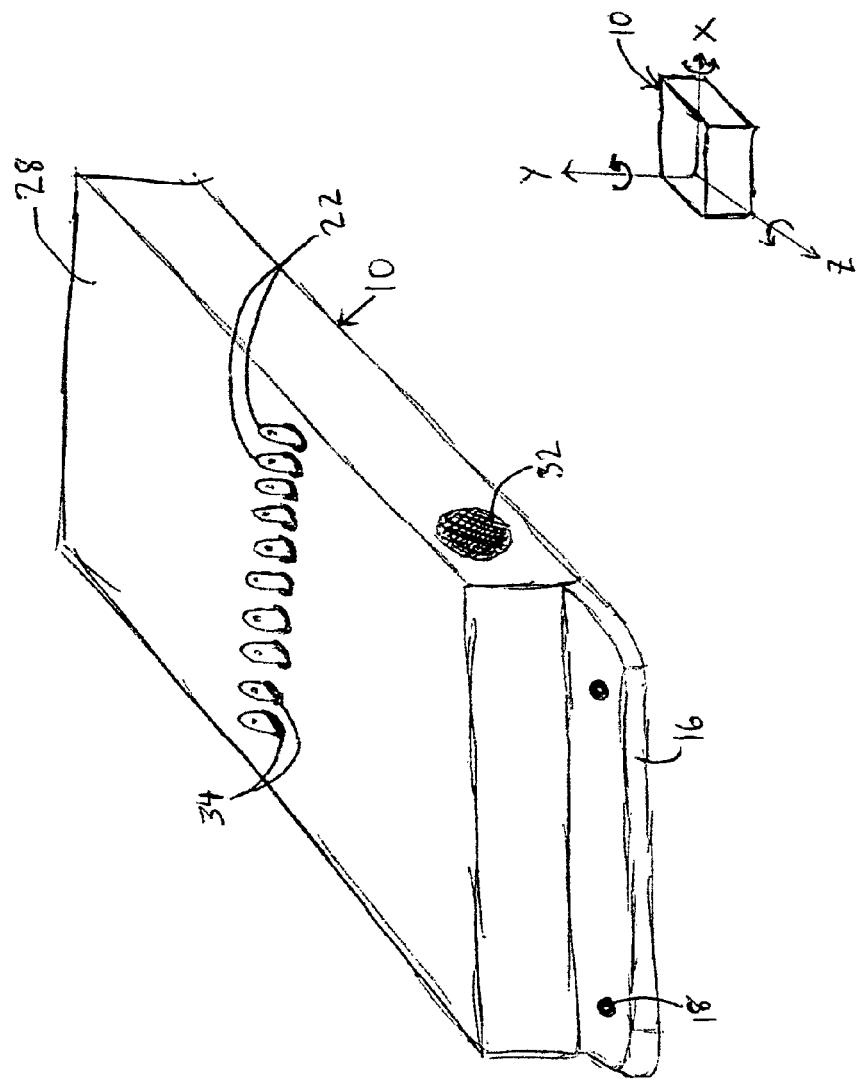
FIG. 12 is an isometric view of a HoD cartridge generator.

FIG. 11 shows a plan view of a HoD cartridge generator 36 electrical schematic.

Since other changes to fit particular operating requirements will be apparent to those skilled in the art, the invention is not considered limited to the example chosen for purposes of disclosure, and covers all changes which do not constitute departures from the true spirit and scope of this invention.

Having thus described the invention, what is desired to be protected by Letters Patent is presented in the subsequently-appended claims.

What is claimed is:

1. A cartridge-based, hydrogen on-demand generator system comprising:
  (a) a hydrogen on-demand cartridge for generation of hydrogen as an additive for fossil-fuel-powered systems;
  (b) at least one conductive material member for creating a specified serpentine-shaped, substantially longitudinal hydrodynamically-engineered flow path or paths for electrolyte solution to flow through in which an electrochemical reaction is facilitated;
  (c) an enclosure for an artificial or natural sealed-off area to protect and separate parts and processes inside a said cartridge from those outside said cartridge, defining a conduit for said hydrodynamically-engineered flow path or paths within said cartridge, rigidly constructed to said cartridge to further provide a complimentary hydrodynamically-engineered flow for electrolyte solution through said path or paths to dislodge gas bubbles without the need for additional air or exhaust gas outside a closed-loop system, wherein inner walls relative to the hydrogen on-demand cartridge complete enclosure contain at least one enclosure rounded corner to facilitate transfer of gases through the cartridge;
  (d) at least one conductive material electrical interface tab that is part of at least one conductive material member in which it supports and maintains the position of each said member to facilitate at least heat and electrical energy transfer into and out of said cartridge, rigidly connected to said at least one conductive material member creating a specified serpentine-shaped, substantially longitudinal hydrodynamically-engineered flow path or paths for electrolyte solution to flow through in which an electrochemical reaction is facilitated;

(e) at least one narrow aperture to support each said material member from said tab, structurally embedded to said cartridge for said material member to support and maintain the position of each said member to facilitate said energy transfer into and out of said cartridge, and structurally embedded to said enclosure, said at least one aperture oriented in parallel with respect to said members;

(f) at least one mounting flange for a projected rim, collar, or rib that serves to support and maintain the position of said cartridge as-mounted in any orientation;

(g) at least one mounting hole for a hollow place in said cartridge to help support and maintain the position of said cartridge as-mounted in any orientation;

(h) at least one inlet for attachment to facilitate at least one entrance of matter into said cartridge in one or more locations transverse to said members and substantially parallel to said serpentine-shaped, substantially longitudinal hydrodynamically-engineered flow path or paths;

(i) at least one outlet for attachment to facilitate at least one exit of matter from said cartridge in one or more locations transverse to said members and substantially parallel to said serpentine-shaped, substantially longitudinal hydrodynamically-engineered flow path or paths; and (j) at least one fitting hole for a hollow place in the solid surface of said cartridge to support and maintain a fitting or similar device connected snugly to said cartridge as-mounted in any orientation.

2. The cartridge-based, hydrogen on-demand generator in accordance with claim 1, wherein said cartridge comprises at least six sides which are each in direct contact with said hydrodynamically-engineered flow path or paths.

3. The cartridge-based, hydrogen on-demand generator in accordance with claim 1, wherein said conductive material member comprises a plurality of material members equal in length with said tab or tabs spaced a predetermined, staggered distance from each end of said member, based on the orientation of for each member when positioned in said cartridge.

4. The cartridge-based, hydrogen on-demand generator in accordance with claim 1, wherein said enclosure comprises one or more of ceramic and acrylic, in which the interior portion of the lid and interior portion of the base of the cartridge are grooved to retain said conductive material members and to compliment said hydrodynamically-engineered flow path or paths.

5. The cartridge-based, hydrogen on-demand generator in accordance with claim 1, wherein said aperture is a sealed slit in direct contact with said tab or tabs.

6. The cartridge-based, hydrogen on-demand generator in accordance with claim 1, wherein said flange comprises one to four of said mounting holes when said cartridge is mounted in any orientation.

7. The cartridge-based, hydrogen on-demand generator in accordance with claim 1, wherein said one or more mounting holes are integrated in said enclosure in any orientation.

8. The cartridge-based, hydrogen on-demand generator in accordance with claim 1, wherein said one or more outlets are located posterior to said electrolyte solution flow path, in which said outlet or outlets are on the same cartridge side as said one or more inlets, or on a side opposite said one or more inlets cartridge side.

9. An apparatus for cartridge-based, hydrogen on-demand generation on new and used fossil-fuel-powered vehicles comprising:
  a cartridge for generation of hydrogen as an additive for fossil-fuel-powered systems;
  at least one conductive material member for creating a specified serpentine-shaped, substantially longitudinal hydrodynamically-engineered flow path or paths for electrolyte solution to flow through in which an electrochemical reaction is facilitated;
  a complete enclosure for a hydrogen on-demand cartridge rigidly constructed with at least two walls parallel to and two walls perpendicular to a serpentine-shaped hydrodynamically-engineered electrolyte solution flow path wherein inner walls relative to the hydrogen on-demand cartridge complete enclosure contain at least one enclosure rounded corner to facilitate transfer of gases through the cartridge;
  a conductive material member electrical interface tab integral with and extending outward from conductive material members that define said serpentine-shaped hydrodynamically-engineered electrolyte flow path;
  a conductive material mounting slot for a narrow aperture that serves to support each said conductive material member sealing and separating energy transfer into and out of said cartridge, rigidly connected to said conductive material member electrical interface tab, and structurally embedded to said conductive material member;
  an integrated mounting flange that serves to support and maintain a hydrogen on-demand cartridge as-mounted in an orientation orthogonal to said flow path;
  an integrated mounting hole to support and maintain a hydrogen on-demand cartridge as-mounted in an orientation orthogonal to said flow path;
  an inlet fitting for an attachment to facilitate a means of entry for matter to enter the hydrogen on-demand cartridge in one or more locations transverse to said members and substantially parallel to said serpentine-shaped, substantially longitudinal hydrodynamically-engineered flow path or paths;
  an outlet fitting for an attachment to facilitate a means of exit for matter from said cartridge as-mounted in any orientation, in one or more locations transverse to said members and substantially parallel to said serpentine-shaped, substantially longitudinal hydrodynamically-engineered flow path or paths; and
  a fitting hole for a hollow place in the solid surface of said cartridge that serves to support and maintain a fitting connected snugly to said cartridge as-mounted in any orientation, in one or more locations transverse to said members and substantially parallel to said serpentine-shaped, substantially longitudinal hydrodynamically-engineered flow path or paths.

10. A cartridge-based, hydrogen on-demand generator comprising:
  a readily replaceable hydrogen on-demand cartridge generator to be fitted on combustion- or diesel-powered engines, whereby the cartridge may be mounted in any orientation;
  a conductive material member, for creating a specified path or paths for matter to follow in which an electrochemical reaction is facilitated;
  a complete enclosure, for an artificial or natural sealed-off area to protect and separate parts and processes inside said generator from those outside said generator, rigidly constructed to said cartridge wherein inner walls relative to the hydrogen on-demand cartridge complete enclosure contain at least one enclosure rounded corner to facilitate transfer of gases through the cartridge;

a conductive material member electrical interface tab, for a projected flat rim or rib which serves to support and maintain the position of each said member to facilitate energy transfer in and out of said cartridge, rigidly connected to said conductive material member;

a conductive material mounting slot for a narrow aperture that serves to support each said member sealing and separating energy transfer inside and outside said generator, structurally embedded to said member electrical interface tab, orthogonally and structurally embedded to said member;

an integrated mounting flange that serves to support, and maintain said generator cartridge as-mounted in an orientation either substantially transverse to or substantially parallel to said flow path;

an integrated mounting hole, for a hollow place in said cartridge to help support, and maintain said position and angle of said cartridge with respect to the center of the cartridge;

an inlet fitting for an attachment to facilitate a means of entry for matter to enter the hydrogen on-demand cartridge in one or more locations parallel or transverse to said members and substantially transverse or parallel to said flow path or paths;

an outlet fitting for an attachment to facilitate a means of exit for matter from said cartridge as-mounted in any orientation, in one or more locations transverse to said members and substantially parallel to said flow path or paths; and a fitting hole for a hollow place in the solid surface of said cartridge that serves to support and maintain a fitting connected snugly to said cartridge as-mounted in any orientation, in one or more locations transverse to said members and substantially parallel to said flow path or paths.

* * * * *